(12) United States Patent
Sellei

(10) Patent No.: US 12,514,559 B2
(45) Date of Patent: Jan. 6, 2026

(54) METHOD FOR MEASURING THE INTERNAL PRESSURE OF A COMPARTMENT

(71) Applicant: COMPREMIUM AG, Muri bei Bern (CH)

(72) Inventor: Richard Martin Sellei, Frankfurt am Main (DE)

(73) Assignee: COMPREMIUM AG, Muri bei Bern (CH)

( * ) Notice: Subject to any disclaimer, the term of this patent is extended or adjusted under 35 U.S.C. 154(b) by 0 days.

(21) Appl. No.: 18/555,036

(22) PCT Filed: Apr. 13, 2022

(86) PCT No.: PCT/EP2022/059892
§ 371 (c)(1),
(2) Date: Oct. 12, 2023

(87) PCT Pub. No.: WO2022/219051
PCT Pub. Date: Oct. 20, 2022

(65) Prior Publication Data
US 2024/0374239 A1    Nov. 14, 2024
US 2025/0248689 A2    Aug. 7, 2025

(30) Foreign Application Priority Data
Apr. 13, 2021 (DE) ............ 10 2021 109 202.7

(51) Int. Cl.
*A61B 8/00* (2006.01)
*A61B 5/00* (2006.01)

(52) U.S. Cl.
CPC ............ *A61B 8/485* (2013.01); *A61B 5/4519* (2013.01); *A61B 8/4254* (2013.01); *A61B 8/5207* (2013.01)

(58) Field of Classification Search
CPC ..... A61B 8/485; A61B 5/4519; A61B 8/4254; A61B 8/5207; A61B 5/0053;
(Continued)

(56) References Cited

U.S. PATENT DOCUMENTS 6,086,533 A     7/2000  Madsen et al.
10,925,583 B1   2/2021  Moehring et al.
(Continued)

FOREIGN PATENT DOCUMENTS

CH    707046 A2      3/2014
DE    197 54 085 A1  12/1997
EP    0 920 833 A1   6/1999

OTHER PUBLICATIONS

Sellei RM, Non-invasive measurement of muscle compartment elasticity in lower limbs to determine acute compartment syndrome: Clinical results with pressure related ultrasound. Injury. Feb. 2020;51(2):301-306. doi: 10.1016/j.injury.2019.11.027. Epub Nov. 21, 2019. PMID: 31784057. (Year: 2020).*

(Continued)

*Primary Examiner* — Michael J Carey
*Assistant Examiner* — Zainab Mohammed Aldarraji
(74) *Attorney, Agent, or Firm* — Ladas & Parry LLP; Malcolm MacDonald

(57) ABSTRACT

The invention relates to a method for measuring an internal pressure (ICP1, ICP2) of a compartment, in particular a muscle compartment, in which an ultrasonic measuring unit coupled to a pressure measuring device is placed on a tissue under which the compartment to be measured is located and a pressure is increased on the tissue by exerting a force. In order to be able to perform a fast and inexpensive, non-invasive measurement of the pressure within a compartment, in particular a muscle lodge (so-called lodge syndrome), it is proposed that the internal pressure (ICP1, ICP2) is deter- (Continued)

Figure 1:
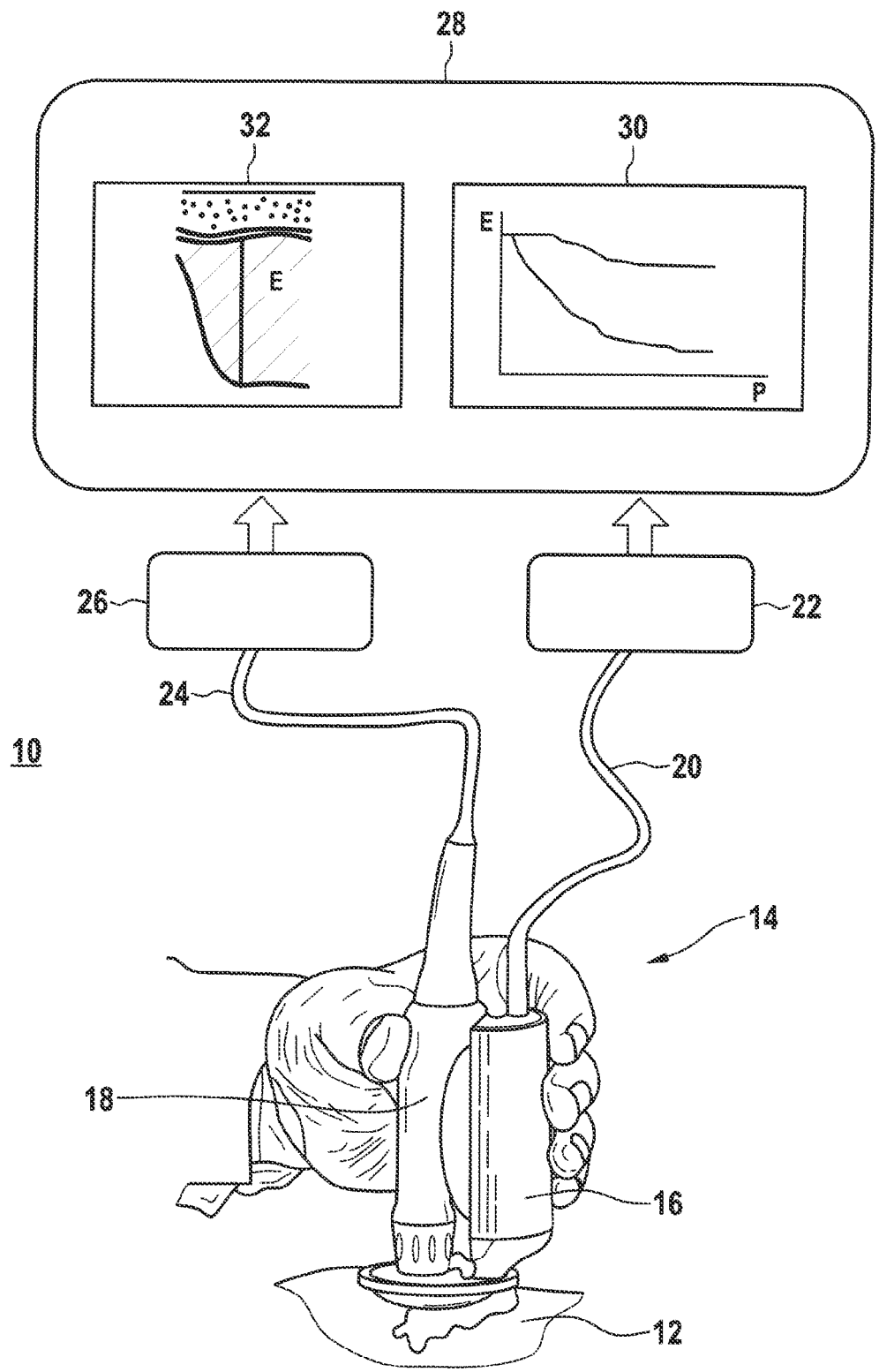

mined from a change Δp in the pressure p acting on the compartment and a change ΔE in an extension E(p) of the compartment that occurs during the action of the pressure p.

13 Claims, 3 Drawing Sheets

(58) Field of Classification Search
CPC ....... A61B 8/0858; A61B 8/48; A61B 8/5223; A61B 8/085; A61B 8/08
See application file for complete search history.

(56) References Cited

U.S. PATENT DOCUMENTS

| | | |
|---|---|---|
| 2006/0025686 A1 | 2/2006 | Ueno et al. |
| 2007/0270720 A1 | 11/2007 | Fry |
| 2010/0225125 A1 | 9/2010 | Rampen |
| 2020/0315583 A1 | 10/2020 | Baumann |

OTHER PUBLICATIONS

International Search Report, dated Jul. 22, 2022, corresponding to International Application No. PCT/EP/2022/059892.
Sellei, R.M. et al. "Assessment of elevated compartment pressures by pressure-related ultrasound: a cadaveric model", European Journal of Trauma and Emergency Surgery, Springer Berlin Heidelberg, Berlin/Heidelberg, vol. 41, No. 6, Sep. 25, 2014 (Sep. 25, 2014), pp. 639-645, XP035740542.

\* cited by examiner

METHOD FOR MEASURING THE INTERNAL PRESSURE OF A COMPARTMENT

The invention relates to a method for measuring an internal pressure of a compartment, in particular a muscle compartment, in which an ultrasonic measuring unit coupled to a pressure measuring device is placed on a tissue under which the compartment to be measured is located and a pressure is increased on the tissue by exerting a force.

A method of the type mentioned at the beginning is known from WO2019/106535 A1. In the known method, an ultrasonic measuring unit coupled to a pressure measuring device is placed on a tissue under which the compartment to be measured is located, with the pressure on the tissue being increased until the ultrasonic measurement shows that the compartment has reached a predetermined degree of deformation. The pressure in the compartment is determined from the elasticity present at this point using the pressure measuring device.

In this context, the term "compartment" refers to an anatomically defined space that can be separated from its surroundings. In addition to muscle compartments, the abdominal cavity is also a compartment, for example.

CH 707046 B1 discloses a further pressure measuring device for measuring the pressure of a vein or an organ and for combination with an ultrasound measuring unit, as well as a method for measuring the pressure of a vein. In this method, a pressure measuring device is placed on a tissue under which the vein or organ is located, whereby the pressure on the tissue is increased until the ultrasound measurement shows that the vein or organ reaches a predetermined degree of deformation, whereby the pressure applied at this point in time is determined by the pressure measuring device as the vein pressure or organ pressure.

Based on this, the present invention is based on the task of further developing a method for measuring the internal pressure of a compartment in such a way that a fast and inexpensive, non-invasive measurement of the pressure within a compartment, in particular a muscle compartment (so-called compartment syndrome), can be carried out.

According to the invention, the problem is solved, inter alia, by determining the internal pressure from a change$\Delta$ p in the pressure p acting on the compartment and a change$\Delta$ E in an extension E(p) of the compartment occurring during the action of the pressure p.

Preferably, the internal pressure is determined as the pressure p at which the change$\Delta$ E of the extension in the form of a decrease in the extension E(p) by the change$\Delta$ p of the pressure p in the form of a, preferably defined, increase in the pressure p reaches or exceeds a defined threshold value SW for the first time.

In other words, there is a correlation between the decrease in extension and the pressure p acting on the compartment, whereby the pressure p at which the decrease reaches or exceeds a defined threshold value corresponds to the internal pressure.

According to the invention, the pressure p and the extension E(p) of the compartment in the direction of the force F are measured simultaneously while the force F is applied to the tissue.

Preferably, the change$\Delta$ E in the extension E(p) is determined for a defined change$\Delta$ p in the pressure p by comparing the measured extension E(p) with an initial extension E0 or by comparing two successive measured values of the extension E(p), wherein the measured pressure p at which the measured extension E(p) falls below the initial extension E0 or the immediately previously measured extension E(p) by the threshold value for the first time is determined as the internal pressure.

Preferably, the threshold value SW of the decrease in elongation is in the range of 0%<SW 10%, preferably in the range of 1% s SW 8%, particularly preferably in the range of 3%≤SW≤6%, especially in the range of 4% in relation to the initial elongation E0 or in relation to a measured value immediately preceding the measured elongation.

Particularly preferably, at the beginning of a measurement, i.e. without exerting a force F on the compartment, the initial extension E0 is defined by image points BP1, BP2 in an ultrasound image of the compartment, whereby the force F is subsequently introduced and preferably continuously increased and whereby the change in the extension E(p) as a function of the pressure p is continuously recorded from the recorded ultrasound images by means of an image processing unit.

In a particularly preferred embodiment of the method, a graph or a course of the extension E(p) over the pressure p is determined, wherein a first and/or a second derivative E'. E" of the graph or of the course of the extension E is determined and wherein the measured pressure p, at which the first derivative E' exhibits a discontinuity for the first time, or the measured pressure p, at which the second derivative E" of the course of the extension E exhibits an inflection point for the first time, is determined as the internal pressure TCP of the compartment.

Preferably, the extent E is defined by a distance of at least two image points B1, B2 in an ultrasound image B of the compartment generated by the ultrasound measuring unit. The image points B1, B2 are preferably defined by a user on a border, such as a fascia, of the compartment essentially diametrically opposite one another.

The force F is continuously increased during a measurement, preferably aligned with the image points B1, B2 in the direction of the extension E.

In this case, the extension E changing during the examination movement is determined by means of an image processing unit in the ultrasound image B and continuously plotted over the measured pressure p to determine the graph or course. Further details, advantages and features of the invention are apparent not only from the claims, the features to be taken from these claims—individually and/or in combination—but also from the following description of preferred embodiments to be taken from the drawings and their explanations.

It shows:

FIG. 1 a schematic representation of a measuring system with a pressure measuring device and an ultrasonic measuring unit.

Figure 2A:
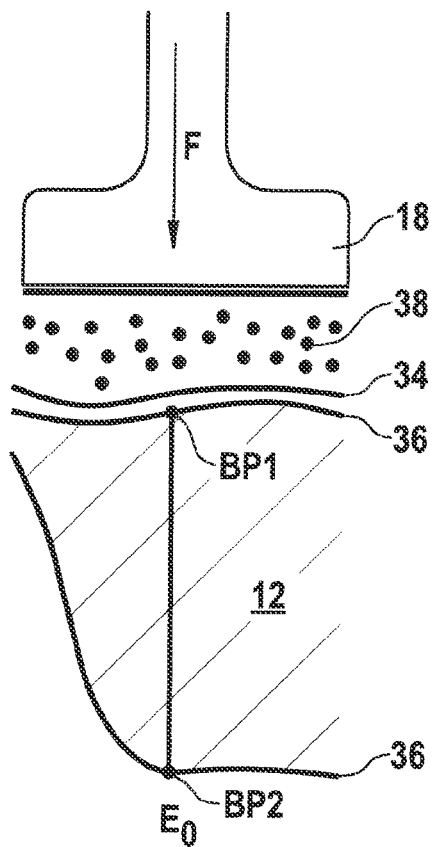
Figure 2B:
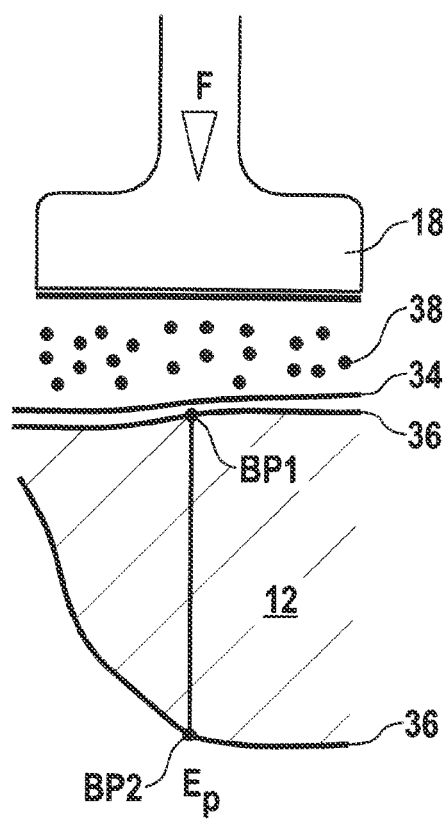

FIG. 2a an ultrasound image of a muscle compartment without compression,

FIG. 2b An ultrasound image of a muscle compartment with compression.

Figure 3:
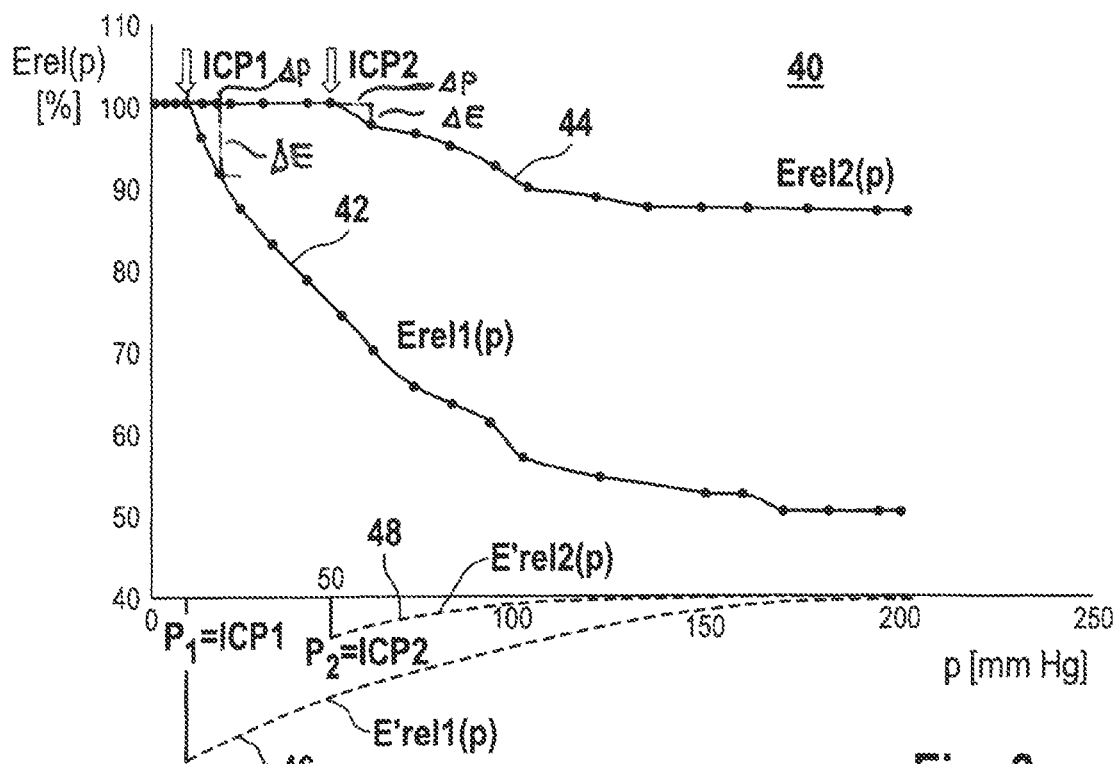
Figure 4:
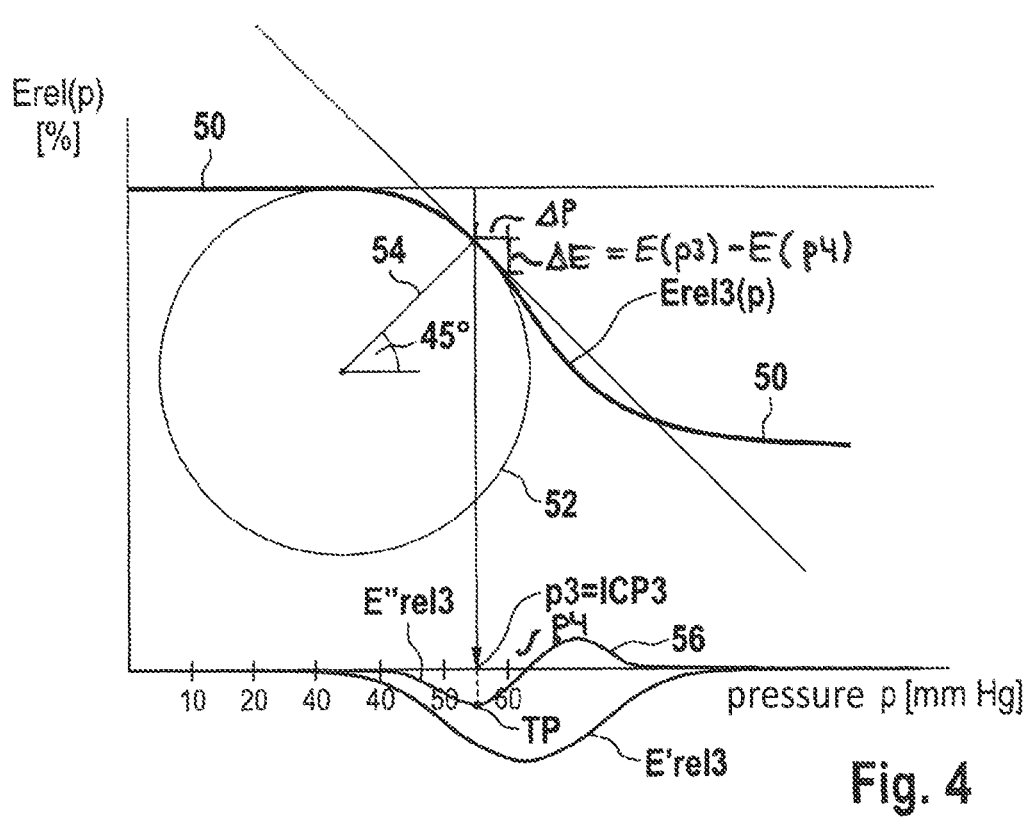

FIG. 3 a pressure-displacement diagram with graphs of an examination movement of a muscle compartment at rest on the one hand and of a muscle compartment in tension on the other hand, and FIG. 4 a pressure-path diagram with a graph of a further examination movement of a compartment.

FIG. 1 shows a measuring system 10 for carrying out ultrasound and pressure measurements on a compartment 12, in particular a muscle compartment 12. The measuring system 10 comprises a measuring device 14, known per se, with a pressure measuring device 16, which is coupled to an ultrasound measuring unit 18. The pressure measuring device 16 is coupled to a pressure evaluation unit 22 via a communication link 20 and the ultrasonic measuring unit 18 is coupled to an image processing unit 26 via a communication link 24.

The image processing unit 26 and the pressure evaluation unit 22 are coupled to a data processing unit 28, which is designed to display the data provided by the image processing unit 26 and the pressure evaluation unit on display units 30, 32.

The method according to the invention is carried out as follows. The pressure measuring device 16 together with the ultrasound measuring unit 18 is placed on a skin surface 34 of the patient in the region of the compartment 12, if necessary using contact gel. For example, a linear transducer head of the company General Electric can be used in combination with an ultrasonic transmissive pressure measuring device 16 from the company VeinPress as the ultrasonic measuring unit 18.

FIG. 2a shows a purely schematic ultrasound image of the compartment 12 at the start of a measurement in cross-section. In the ultrasound image, image points BP1, BP2 are marked by an examiner essentially diametrically opposite one another, preferably on a border 36, such as a fascia, of the compartment 12. The image points mark an extension E in the form of an initial extension E0 at the start of the examination, i.e. without compression.

The pressure measuring device 16 is then used to exert a force F on the tissue. e.g. the skin surface 34 of a lower leg. The force F is introduced into the compartment 12 in alignment with the image points BP1, BP2 and is continuously increased. The force F exerts a continuously increasing pressure P on the compartment 12, which is measured by means of a pressure sensor 38 of the pressure measuring device 16.

FIG. 2b shows an ultrasound image of the muscle compartment 12 in cross-section under compression. i.e. when pressure p is exerted on the tissue by the examiner. The extension E(p) changes as a function of the pressure p and is continuously recorded by the image processing unit 26. An extension E(p) is measured for each measured value of the pressure p and displayed as a graph above the pressure p.

FIGS. 3 and 4 show pressure-displacement diagrams 40, in which graphs 42, 44, 50 of measurements on different muscle compartments are shown.

According to the invention, the internal pressure ICP1, ICP2 is determined from a change $\Delta p$ in the pressure p acting on the compartment 12 and a change $\Delta E$ in an extension E(p) of the compartment 12 during the action of the pressure p.

The internal pressure is determined as the pressure p at which the change $\Delta E$ in the extension in the form of a decrease in the extension E(p) due to the change $\Delta p$ in the pressure p in the form of a preferably defined increase in the pressure p reaches or exceeds a defined threshold value SW for the first time.

In other words, there is a correlation between the decrease in extension and the pressure p acting on the compartment, whereby the pressure p at which the decrease reaches or exceeds a defined threshold value corresponds to the internal pressure.

According to the invention, the pressure p and the extension E(p) of the compartment in the direction of the force F are measured simultaneously while the force F is applied to the tissue.

Preferably, the change $\Delta E$ of the extension E(p) at a defined change $\Delta p$ of the pressure p is determined by a comparison of the measured extension E(p) with an initial extension E0 according to FIG. 3 or by a comparison of two successive measured values of the extension E(p3) and E(p4) according to FIG. 4, whereby the measured pressure p at which the measured extension E(p) falls below the initial extension E0 or the immediately previously measured extension E(p) by the threshold value for the first time is determined as the internal pressure. The defined change $\Delta p$ of the pressure p, at which the change $\Delta E$ of the extension E is determined, is preferably in the range $0 < \Delta p \leq 10$ mmHg.

Preferably, the threshold value SW of the decrease in elongation is in the range of $0\% < SW \leq 10\%$, preferably in the range of $1\% \leq SW \leq 8\%$, particularly preferably in the range of $3\% \leq SW \leq 6\%$, especially in the range of 4% in relation to the initial elongation E0 or in relation to a measured value immediately preceding the measured elongation.

The graph 42 shows an example of the course of a relative extension Erel (p)=(E(p)×100)/E0, which can also be referred to as the relative compartment depth, over the compression pressure p of a resting muscle, i.e. a muscle compartment or a muscle lodge at rest with low internal pressure.

The graph 42 shows the special feature that the relative extension Erel (p) in the case of the resting muscle is essentially constant up to a pressure ICP1 and decreases from pressure ICP1. Investigations have shown that the measured pressure p1, at which the graph 42 drops for the first time, is an internal pressure ICP1 of the muscle compartment, which can also be described as an intracompartmental pressure ICP1.

The graph 44 shows an example of the course of a relative extension Erel (p) of a tensed muscle, i.e. a muscle compartment or a muscle lodge with an increased internal pressure. According to one aspect of the invention, it is provided that the measured pressure p2 is determined as the internal pressure or intracompartmental pressure ICP2 of the muscle compartment 12 at which the relative extension Erel (p) drops for the first time.

To determine the relative extension Erel (p), the extension E(p) determined from the ultrasound image by means of the image processing unit 26 is continuously compared with the initial extension E0. The pressure p1, p2 at which the measured extension E(p) falls below the initial extension E0 by at least 4%, preferably 1% to 2%, is determined as the intracompartmental pressure ICP1, ICP2.

Alternatively, it is possible to mathematically determine and evaluate the graphs 42, 44 of the relative extension Erel (p). In this case, a first derivative E'rel (p) is determined, which is represented by graphs 46, 48. The measured pressure p1, p2, at which the derivative E'rel (p) shows a discontinuity for the first time, is determined as the internal pressure ICP1, ICP2.

FIG. 4 shows a graph 50 of a further measurement, whereby the graph 50 is S-shaped and a defined drop in the relative extension, as shown in FIG. 3, cannot be defined. If, for example, the graph 50 shows the course of a circumference in sections, a circle 52 with a radius 54 can be adapted to the graph 50. In this case, the pressure p at which the radius 54 meets the graph 50 in a 45° position in relation to the abscissa (horizontal axis–pressure p) can be determined as the internal pressure ICP3.

Alternatively, it is also possible in this case to determine and evaluate the graph 50 mathematically. In this case, a second derivative E"rel (p) is determined, which is represented by a graph 56. The measured pressure p3, at which the second derivative E"rel (p) has a low point TP for the first time, is determined as the internal pressure ICP3.

The invention is based on the idea that the relative extension or compartment depth does not initially change during the application of pressure. A plateau is formed, as can be seen in graphs 42, 44 and 50. As the pressure on the compartment increases, the compartment becomes harder and harder. Only from a certain pressure p1, p2, p3, which corresponds to the intracompartmental pressure ICP1, ICP2, ICP3, does the relative extension Erel decrease.

According to the state of the art, the elasticity in the compartment is determined by an elasticity quotient. It was found that the elasticity quotient is subject to high inter-individual fluctuations, which makes interpretation more difficult. The method according to the invention is characterized by the fact that the determination of an elasticity quotient, i.e. the ratio between the deformation of the healthy tissue in relation to the deformation of the diseased tissue, is not necessary. In particular, the non-invasive derivation of a pressure value is of medical advantage.

The invention claimed is:

1. A method for measuring an internal pressure of a compartment, comprising:
    placing an ultrasonic measuring unit coupled to a pressure measuring device on a tissue, under which the compartment to be measured is located, and increasing a pressure p on the tissue by exerting a force F using the pressure measuring device,
    measuring, simultaneously, the pressure p, using the pressure measuring device, and an extension E(p) of the compartment extending in the direction of the force F, using the ultrasonic measuring unit, during the exertion of the force F on the tissue,
    determining a change ΔE in the extension E(p) in the event of a defined change Δp in the pressure p by comparing the measured extension E(p) with an initial extension E0, or by comparing two successive measured values of the extension E(p),
    determining the internal pressure from a change Δp in the pressure p acting on the compartment and a change ΔE in an extension E(p) of the compartment occurring during the action of the pressure p, and
    determining the internal pressure as the pressure p at which the change ΔE of the extension, in the form of a decrease in the extension E(p) by the change Δp of the pressure p, in the form of an increase in the pressure p, reaches or exceeds a defined threshold value SW for the first time.

2. The method according to claim 1, wherein the threshold value SW is in the range of 0%<SW≤10%, in relation to the initial extension E0 or in relation to a measured value immediately preceding the measured extension.

3. The method according to claim 1, wherein, at the beginning of a measurement, without exerting a force F on the compartment, the initial extension E0 is defined by image points in an ultrasound image of the compartment, that subsequently the force F is introduced, and that the change in the extension E(p) as a function of the pressure p is continuously recorded from the ultrasound images by means of an image processing unit.

4. The method according to claim 3, wherein the image points on a border of the compartment are defined essentially diametrically opposite one another by a user.

5. The method according to claim 1, wherein the force F is continuously increased in the direction of the extension E during a measurement.

6. The method according to claim 1, wherein that the extension E, which changes during the measurement, is determined in the ultrasound image by means of the image processing unit and is continuously plotted over the measured pressure p.

7. A method for measuring an internal pressure of a compartment, comprising:
    placing an ultrasonic measuring unit coupled to a pressure measuring device on a tissue, under which the compartment is located, and increasing a pressure p on the tissue by exerting a force F using the pressure measuring device,
    measuring, simultaneously, the pressure p, using the pressure measuring device, and an extension E(p) of the compartment extending in the direction of the force F, using the ultrasonic measuring unit, during the exertion of the force F on the tissue,
    wherein a graph of the extension E(p) above the pressure p is determined, wherein a first and/or a second derivative E', E" of the graph of the extension E(p) is determined, and wherein the measured pressure p, at which the first derivative E' exhibits a discontinuity for the first time, or the second derivative E" of the course of the extension E(p) exhibits a low point for the first time, is determined as the internal pressure of the compartment.

8. The method according to claim 1, wherein the threshold value SW is in the range of 1%≤SW≤8%.

9. The method according to claim 1, wherein the threshold value SW is in the range of 3%≤SW≤6%.

10. The method according to claim 1, wherein the threshold value SW is in the range of 4%.

11. The method according to claim 1, wherein the force F is increased in alignment with a line connecting the image points.

12. The method according to claim 3, after the force F is introduced, the force F is continuously increased.

13. The method according to claim 4, wherein the border is a fascia.

* * * * *